(12) United States Patent
Katsuta et al.

(10) Patent No.: US 6,914,116 B2
(45) Date of Patent: Jul. 5, 2005

(54) LIGHT-COLORED WATER BASED INTERCOAT COATING COMPOSITION AND MULTI-LAYER COATING FILM FORMED BY USE OF THE SAME

(75) Inventors: Hideaki Katsuta, Kanagawa-ken (JP); Hideo Sugai, Kanagawa-ken (JP); Shingo Sato, Kanagawa-ken (JP); Fumio Yamashita, Kanagawa-ken (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 10/630,813

(22) Filed: Jul. 31, 2003

(65) Prior Publication Data

US 2004/0030087 A1 Feb. 12, 2004

(30) Foreign Application Priority Data

Aug. 8, 2002 (JP) .................................. 2002-231297

(51) Int. Cl.$^7$ .............................................. C08G 18/80
(52) U.S. Cl. ..................... 528/45; 524/839; 428/423.1
(58) Field of Search ........................... 524/839; 528/45; 428/423.1

(56) References Cited

U.S. PATENT DOCUMENTS

| 5,455,297 A | 10/1995 | Pedain et al. |
| 5,705,595 A | 1/1998 | Oda et al. |
| 6,063,860 A | 5/2000 | Rimmer et al. |
| 6,187,860 B1 | 2/2001 | Konig et al. |
| 2002/0165334 | 11/2002 | Melchiors et al. |

FOREIGN PATENT DOCUMENTS

| EP | 0853639 | 7/1998 |
| EP | 0942023 | 9/1999 |
| EP | 1110987 | 8/2004 |
| JP | 304843/95 | 11/1995 |
| JP | 225509/96 | 9/1996 |
| JP | 512772/99 | 11/1999 |
| JP | 3292886 | 6/2002 |
| WO | 02/055577 | 7/2002 |

OTHER PUBLICATIONS

Coating and Coating Composition, Oct., 2000 pp. 16–27, Trend of Water Based Polyurethane Resin.

*Primary Examiner*—Rachel Gorr
(74) *Attorney, Agent, or Firm*—Fisher, Christen & Sabol

(57) ABSTRACT

A light-colored water based intercoat coating composition containing a hydroxyl group-containing resin (A), a curing agent (B) and a color pigment (C), a resulting coating film having a lightness index or a L value of 80 or more, the curing agent (B) being a blocked polyisocyanate curing agent ($B_1$) blocked with a pyrazole blocking agent.

14 Claims, No Drawings

LIGHT-COLORED WATER BASED INTERCOAT COATING COMPOSITION AND MULTI-LAYER COATING FILM FORMED BY USE OF THE SAME

This application has priority benefit of Japanese Patent Application Number 02/231297, filed on Aug. 8, 2002.

BACKGROUND ART

(1) Field of the Invention

The present invention relates to a light-colored water based intercoat coating composition showing excellent properties in a low volatile organic compound content and in coating composition stability, and capable of forming a coating film showing excellent properties in anti-chipping properties, yellowing resistance and beautiful appearance, and to a multi-layer coating film formed by use of the light-colored water based intercoat coating composition.

(2) Description of Background Art

The automobile body is usually coated with a multi-layer coating film comprising an undercoat coating film with an electrodeposition coating composition, an intercoat coating film and a topcoat coating film for the purpose of imparting anti-corrosive properties and beautiful appearance. While an automobile is running, pebbles, gravels, anti-freezing agents, ice bumps, etc. on the road may rebound so as to collide against the automobile body, resulting in drawbacks of making mars on the multi-layer coating film, locally braking and peeling off the multi-layer coating film, showing poor appearance, exposing a metal substrate, developing rusts for corrosion (these drawbacks may be called as "chipping" hereinafter).

On the other hand, a coating composition using an organic solvent has mainly been used in the art. Since the use of the organic solvent may have a matter of concern about influences on health and environment due to a solvent vapor volatilized into the atmosphere, the use of a water based coating composition for use in the automobile has been advanced, and in the field of the intercoat coating composition for use in the automobile, developments of a water based intercoat coating composition imparted with various kinds of functions have been made.

Japanese Patent Application Laid-Open No. 209066/96 corresponding to U.S. Pat. No. 5,705,595 discloses a water based intercoat coating composition by use of a blocked isocyanate such as an aliphatic polyisocyanate oligomer, adduct of the oligomer, adduct of aliphatic polyisocyanate and the like, for the purpose of improving anti-chipping properties.

U.S. Pat. No. 5,455,297 discloses a water based coating composition using an aqueous isocyanate.

Some water based intercoat coating compositions use a mixture of water with a water-soluble organic solvent as a solvent from the standpoints of coating composition stability and coating workability, wherein an amount of the water-soluble organic solvent is desired to be reduced to a minimum.

Recently, a prior art reference (see Coating and Coating Composition, October, 2000, pages 16–27, Trend of Water Based Polyurethane Resin) reports on reduction of an amount of an organic solvent in the coating composition or reduction of volatile organic compound (VOC), as well as anti-chipping properties.

Reduction of the volatile organic compound or a volatile solvent in the water based intercoat coating composition is strongly demanded, and developments of a water based intercoat coating composition capable of providing improved anti-chipping properties are demanded. However, simple combinations of the above prior art would be impossible to develop a coating composition well balanced in anti-chipping properties, low volatile organic compound content, water resistance and coating composition stability.

Recently, in a multi-layer coating film for use in an automobile outer plate, a white pearl coating color using a mica as a luster agent is becoming a mainstream, and for the purpose of imparting anti-chipping properties, a blocked polyisocyanate curing agent is used in the intercoat coating composition, wherein a blocking agent such as methyl ethyl ketoxime, alcohol and the like is used. The use of the methyl ethyl ketoxime as the blocking agent may produce a problem of a film yellowing due to heat curing, resulting in making difficult a white pearl coating color design in a coating composition having anti-chipping properties. The use of alcohol as the blocking agent may not result yellowing, but a high dissociation temperature of the blocking agent makes it impossible to obtain a satisfactory curing properties in a temperature range of curing the automobile intercoat coating composition.

A Japanese Patent Application Laid-Open No. 512772/99 corresponding to WO97/12924 discloses a white paint composition containing an acrylic emulsion, a blocked isocyanate blocked with a 3,5-dimethylpyrazole blocking agent and the like, and a coating method which comprises coating the composition onto a coating substrate, followed by curing at 120° C. for 45 minutes, but discloses neither the use of a specified polyester resin containing as essential components an alicyclic polybasic acid, an alicyclic polyhydric alcohol and the like, nor improvements in anti-chipping properties by the use of the polyester resin.

Japanese Patent Application Laid-Open No. 2000-26570 corresponding to EP 0942023 discloses that a transparent coating composition containing a hydroxypolyester, a 3,5-dimethylpyrazole-blocked polyisocyanate crosslinking agent and the like is coated onto a coating substrate, followed by heat curing at 120° C. for 30 minutes to form a coating film showing higher film hardness, improved solvent resistance and higher corrosion resistance compared with a transparent coating composition containing a hydroxypolyester, butanoneoxime-blocked polyisocyanate crosslinking agent and the like, but discloses neither the use of a specified polyester resin containing as essential components an alicyclic polybasic acid, an alicyclic polyhydric alcohol and the like, nor improvements in anti-chipping properties by use of the polyester resin.

Japanese Patent Application Laid-Open No. 2001-181568 corresponding to EP 1110987 discloses a coating composition containing a condensation product of a carboxyl group-containing such as respectively carboxyl group-containing polyester resin, polyurethane resin, acrylate resin and the like with a hydroxyl group-containing resin such as respectively hydroxyl group-containing polyester resin, acrylic resin, polyurethane resin, epoxy resin and the like, and a mixture of a water-insoluble blocked isocyanate curing agent and a hydrophilic blocked isocyanate curing agent respectively blocked with a known blocking agent, discloses a method which comprises coating the coating composition onto a metal substrate to form a surfacer coating film, discloses that the use of the 3,5-dimethylpyrazole blocking agent particularly preferable because of showing non-toxicity and no yellowing at 180° C. or higher, and discloses that the combination of the water-insoluble component with the hydrophilic component results improvements in gloss and anti-stone chipping properties of the resulting multi-layer coating film, but discloses neither the use of a specified polyester resin containing as essential components an alicyclic polybasic acid, an alicyclic polyhydric alcohol and the like, nor improvements in anti-chipping properties by use of the polyester resin.

Japanese Patent Application Laid-Open No. 304843/95 discloses, as an example, that a transparent coating composition prepared by reacting a mixture of a hydroxyl group-containing polyacrylate resin and a polyester polyol with a blocked polyisocyanate crosslinking agent obtained by blocking 1,6-diisocyanatohexane with a blocking agent mixture of 1,2,4-triazole, 3,5-dimethylpyrazole and methoxypropyl acetate at an equivalent ratio of NCO/OH was subjected to a thermal yellowing measurement after a curing procedure and a thermal yellowing measurement after an overbaking procedure with the result that the above thermal yellowing is remarkably reduced compared with the case where a butanoneoxime is used as a blocking agent, discloses that the blocked polyisocyanate crosslinking agent obtained by blocking with the blocking agent mixture is preferable for use in a topcoat in an automobile multi-layer coating film, but does not disclose the use of the above blocked polyisocyanate crosslinking agent in an intercoat, and discloses neither the use of a specified polyester resin containing as essential components an alicyclic polybasic acid, an alicyclic polyhydric alcohol and the like, nor improvements in anti-chipping properties by use of the polyester resin.

Japanese Patent Application Laid-Open No. 225509/96 discloses a method of preparing a polyisocyanate at least partly blocked with 3,5-dimethylpyrazole, exemplifies other blocking agents such as butanoneoxime, 1,2,4-triazole, diisopropylamine, diethyl maleate, ethyl acetoacetate and the like, discloses that a laquer polyisocyanate blocked with 3,5-dimethylpyrazole is usable as a crosslinking agent for one component polyurethane coating composition, and makes possible a considerably low thermal yellowing of a coating and a comparatively low curing temperature of about 130° C. compared with other blocking agents such as butanoneoxime and the like, but does not disclose the use of the blocked polyisocyanate obtained by blocking with 3,5-dimethylpyrazole as a crosslinking agent for an intercoat coating composition, and discloses neither a combination thereof with a specified polyester resin containing as essential components an alicyclic polybasic acid, an alicyclic polyhydric alcohol and the like, nor resulting improvements in anti-chipping properties.

Japanese Patent No. 3292886 discloses a water based intercoat coating composition containing as essential components a hydroxyl group-acid group-containing polyester resin, amino resin, alicyclic epoxy compound, neutralizing agent, pigment and water, and discloses that the addition of the alicyclic epoxy compound to the coating composition known in the art makes possible for the epoxy group in the epoxy compound to trap a basic substance and to take place a usual reaction between amino group and hydroxyl group, resulting in making it possible to show good performances in coating film curing properties, satisfactory anti-chipping properties as an intercoat coating film and the like, but discloses neither the use of a specified polyester resin containing as essential components an alicyclic polybasic acid, an alicyclic polyhydric alcohol and the like, nor resulting improvements in anti-chipping properties, and discloses neither the use of the blocked polyisocyanate curing agent, particularly the blocked polyisocyanate curing agent obtained by blocking with the 3,5-dimethylpyrazole blocking agent, nor resulting improvements in yellowing resistance.

SUMMARY OF THE INVENTION

It is an object of the present invention to solve the above problems in the art and to provide a water based intercoat coating composition capable of showing good properties in anti-chipping properties, yellowing resistance and beautiful appearance.

That is, the present invention provides a light-colored water based intercoat coating composition containing a hydroxyl group-containing resin (A), a curing agent (B) and a color pigment (C), a resulting coating film having a lightness index or a L value of 80 or more, the curing agent (B) being a blocked polyisocyanate curing agent ($B_1$) blocked with a pyrazole blocking agent.

The lightness index or L value is a value determined by a method which comprises determining a stimulus value Y in the XYZ standard calorimetric system by a photoelectric tristimulus colorimetry by use of a standard illuminant C and a photoelectric colorimeter (Z-1001 DP type colorimetry color difference calorimeter, trade name, marketed by Nippon Denshoku Industries Co., Ltd.) in accordance with the description in JIS Z 8722, followed by determining the L value from the stimulus value Y determined as above according to the equation: $L=10Y^{1/2}$ as described in JIS Z 8730 (1980) under the condition (d) as described in JIS Z 8722, paragraph 4.3.1 as a geometrical condition of an illumination and light reception. The larger the L value, the higher the whiteness.

The blocking agent (B) is also a mixture of the blocked polyisocyanate curing agent ($B_1$) with at least one curing agent selected from the group consisting of a blocked polyisocyanate curing agent ($B_2$) blocked with a blocking agent other than the pyrazole blocking agent, a water-dispersible blocked polyisocyanate curing agent ($B_3$) and a melamine resin curing agent ($B_4$).

The blocked polyisocyanate curing agent ($B_1$) is preferably a blocked polyisocyanate curing agent blocked with 3,5-dimethylpyrazole blocking agent.

The polyisocyanate constituting the blocked polyisocyanate curing agent ($B_1$), ($B_2$) or ($B_3$) is an aliphatic polyisocyanate or an alicyclic polyisocyanate.

The water based intercoat coating composition of the present invention preferably further contain an extender pigment (D) and an urethane emulsion (E).

The present invention also provides a multi-layered coating film formed by successively coating a cationic electrodeposition coating composition, coating the above water based intercoat coating composition, optionally curing, and coating a topcoat coating composition by at least one layer.

DETAILED DESCRIPTION OF THE INVENTION

The water based intercoat coating composition and the multi-layered coating film of the present invention are explained more in detail hereinafter.

The hydroxy group-containing resin (A) may include an at least one active hydrogen-containing compound, for example, ones selected from alcohols, amines, polyhydroxypolyesters, polylactones, hydroxypolycarbonates, polythioethers, polyacetals, polyether esters, polyester amides and polyamide-polyamine resin such as a product obtained from a dimerized aliphatic acid and aliphatic acid polyamide, and the active hydrogen atom-containing compound may preferably include a carboxyl group and hydroxyl group-containing acrylic resin, a water-dispersible polyester or polyether resin, polycarbonate resin, urethane resin, tertiary amine group-containing hydroxyacrylic resin, and polymers thereof.

The hydroxyl group-containing polyester resin may be a hydroxyl group-containing polyester resin ($A_1$) containing as essential components at least one polybasic acid selected from the group consisting of an alicyclic polybasic acid ($a_1$) and other polybasic acid ($a_3$), and at least one polyhydric alcohol selected from the group consisting of an alicyclic polyhydric alcohol ($a_2$) and other polyhydric alcohol ($a_4$), preferably a hydroxyl group-containing polyester resin ($A_2$) containing as essential components an alicyclic polybasic acid ($a_1$) and/or an alicyclic polyhydric alcohol ($a_2$), other polybasic acid ($a_3$) and other polyhydric alcohol ($a_4$)

The alicyclic polybasic acid ($a_1$) is a compound having at least one alicyclic structure mainly of 4 to 6 membered rings and at least two carboxyl groups in one molecule, and may include, for example, cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, methylhexahydrophthalic acid, and anhydrides thereof.

The other polybasic acid ($a_3$) is a compound having at least two carboxyl groups in one molecule, and may include, for example, phthalic acid, isophthalic acid, terephthalic acid, naphthalene dicarboxylic acid, 4,4-diphenyl dicarboxylic acid, diphenylmethane-4,4'-dicarboxylic acid, succinic acid, adipic acid, azelaic acid, sebacic acid, HET acid, maleic acid, fumaric acid, itaconic acid, trimellitic acid, pyromellitic acid, anhydrides thereof.

The alicyclic polyhydric alcohol ($a_2$) is compound having at least one alicyclic structure of mainly 4 to 6 membered rings and at least two hydroxyl groups in one molecule, and may include, for example, 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane and the like.

Of the other polyhydric alcohol ($a_4$), a polyhydric alcohol having two hydroxyl groups in one molecule may include, for example, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactonediol obtained by addition of lactones such as ε-caprolactone and the like, polyester diols such as bis(hydroxyethyl) terephthalate and the like.

Of the other polyhydric alcohol ($a_4$), a polyhydric alcohol having at least three hydroxyl groups in one molecule may include, for example, glycerin, trimethylolpropane, trimethylolethane, diglycerin, triglycerin, 1,2,6-hexanetriol, pentaerythritol, dipentaerythritol, sorbitol, mannitol and the like.

A content of the alicyclic polybasic acid ($a_1$) and/or the alicyclic polyhydric alcohol ($a_3$) in the polyester resin ($A_2$) is in the range of 20 to 70% by weight, preferably 30 to 60% by weight based on a total solid content of monomers constituting the polyester resin ($A_2$).

A content less than 20% by weight of the alicyclic polybasic acid ($a_1$) and/or the alicyclic polyhydric alcohol ($a_2$) is ineffective on improvement in anti-chipping properties. A content more than 70% by weight may reduce weather resistance.

The polyester resin ($A_1$) or ($A_2$) obtained by reacting the alicyclic polybasic acid ($a_1$), other polybasic acid ($a_3$), the alicyclic polyhydric alcohol ($a_2$) and other polyhydric alcohol ($a_4$) has a weight average molecular weight in the range of 1,000 to 1000,000, preferably 2,000 to 10,000, a hydroxyl value in the range of 30 to 200 mgKOH/g, preferably 50 to 180 mgKOH/g, and an acid value in the range of 5 to 100 mgKOH/g, preferably 10 to 60 mgKOH/g.

The hydroxyl group-containing acrylic resin in the present invention may be prepared by copolymerizing a hydroxyl group-containing polymerizable monomer and an acrylic monomer-containing polymerizable monomer component, and may preferably have a number average molecular weight of 1000 to 50000, particularly 2000 to 20000, a hydroxyl value of 20 to 200 mgKOH/g, particularly 50 to 150 mgKOH/g, and an acid value of 3 to 100 mgKOH/g, particularly 20 to 70 mgKOH/g.

The hydroxyl group-containing polymerizable monomer is a compound having at least one hydroxyl group and polymerizable unsaturated bond respectively in one molecule, and may include, for example, monoester compounds of $C_{2-20}$ glycol with (meth)acrylic acid such as hydroxyethyl (meth)acrylate, hydroxypropyl (meth)acrylate, hydroxybutyl (meth)acrylate and the like, and the like. The acrylic monomer is a monoester compound of (meth)acrylic acid with $C_{1-22}$ monohydric alcohol, and may include, for example, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate and the like.

The polyester resin and the acrylic resin in the present invention may be used in combination with an urethane-modified polyester resin and an urethane-modified acrylic resin prepared by subjecting a part of hydroxyl groups in the resins and a polyisocyanate compound to an urethanization reaction for chain-lengthening and forming high molecular weight resins respectively.

That is, the urethane-modified hydroxyl group-containing polyester resin is a high molecular weight resin prepared by subjecting a part of the hydroxyl groups in the hydroxyl group-containing polyester resin and the polyisocyanate compound to an urethanization reaction for chain lengthening.

The polyisocyanate compound may include, for example, aliphatic polyisocyanates such as hexamethylene diisocyanate, trimethylhexamethylene diisocyanate, dimer acid diisocyanate, lysine diisocyanate, and the like; biuret type adducts of the above polyisocyanate, isocyanuric type adducts, and the like; alicyclic diisocyanates such as isophorone diisocyanate, 4,4'-methylenebis (cyclohexylisocyanate), methylcyclohexane-2,4-(or -2,6-) diisocyanate, 1,3-(or 1,4-) di(isocyanatomethyl) cyclohexane, 1,4-cyclohexane diisocyanate, 1,3-cyclopentane diisocyanate, 1,2-cyclohexane diisocyanate and the like; biuret type adducts of the above polyisocyanate, isocyanuric ring type adducts; aromatic diisocyanate compounds such as xylylene diisocyanate, met-axylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone, isopropylidenebis(4-phenylisocyanate) and the like; biuret type adducts of the above polyisocyanates, isocyanuric type ring adducts; polyisocyanates having at least three isocyanate groups in one molecule, for example, triphenylmethane-4,4'-4"-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts of the above polyisocyanates, isocyanuric type ring adducts; urethanized adducts obtained by reacting a polyisocyanate compound with a polyol such as ethylene glycol, propylene glycol, 1,4-butylene glycol, dimethylolpropionic acid, polyalkylene glycol, trimethylolpropane, hexanetriol and the like in an excess amount of isocyanate group to hydroxyl group of the polyol; biuret type adducts of the above polyisocyanates, isocyanuric type ring adducts; and the like.

The curing agent ($B_1$) or ($B_2$) used as the crosslinking agent may be prepared by blocking the isocyanate group of the polyisocyanate having at least two free isocyanate groups in one molecule with a blocking agent respectively.

The polyisocyanate in the blocked polyisocyanate curing agent ($B_1$) or ($B_2$) may include, for example, aliphatic polyisocyanates such as hexamethylene diisocyanate, trimethylhexamethylene diisocyanate, dimer acid diisocyanate, lysine diisocyanate, and the like; biuret type adducts of the above polyisocyanate, isocyanuric type adducts, and the like; alicyclic diisocyanates such as isophorone diisocyanate, 4,4'-methylenebis (cyclohexylisocyanate), methylcyclohexane-2,4-(or -2,6-) diisocyanate, 1,3-(or 1,4-) di(isocyanatomethyl) cyclohexane, 1,4-cyclohexane diisocyanate, 1,3-cyclopentane diisocyanate, 1,2-cyclohexane diisocyanate and the like; biuret type adducts of the above polyisocyanate, isocyanuric ring type adducts; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone, isopropylidenebis (4-phenylisocyanate) and the like; biuret type adducts of the above polyisocyanates, isocyanuric type ring adducts; polyisocyanates having at least three isocyanate groups in one molecule, for example, triphenylmethane-4,4'-4"-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts of the above polyisocyanates, isocyanuric type ring adducts; urethanized adducts obtained by reacting a polyisocyanate compound with a polyol such as ethylene glycol, propylene glycol, 1,4-butylene glycol, dimethylolpropionic acid, polyalkylene glycol, trimethylolpropane, hexanetriol and the like in an excess amount of isocyanate group to hydroxyl group of the polyol; biuret type adducts of the above polyisocyanates, isocyanuric type ring adducts; and the like.

Heating of the blocking agent used to block a free isocyanate group at 100° C. or higher, preferably 130° C. or higher makes it possible to easily react with hydroxyl group.

The blocking agent used in the curing agent ($B_1$) of the present invention may include, for example, 3,5-dimethylpyrazole, 3-methylpyrazole, 4-nitro-3,5-dimethylpyrazole, 4-bromo-3,5-dimethylpyrazole and the like. Of these, 3,5-dimethylpyrazole is preferable. The other blocking agent used in the curing agent ($B_2$) of the present invention may include, for example, phenols such as phenol, cresol, xylenol, nitrophenol, ethylphenol, hydroxydiphenyl, butylphenol, isopropylphenol, nonylphenol, octylphenol, methyl hydroxybenzoate, and the like; lactams such as ε-caprolactam, δ-valerolactam, γ-butylolactam, β-propiolactam, and the like; aliphatic alcohols such as methanol, ethanol, propyl alcohol, butyl alcohol, amyl alcohol, lauryl alcohol and the like; ethers such as ethylene glycol monomethyl ether; ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolates such as methyl glycolate, ethyl glycolate, butyl glycolate and the like; lactic acid, lactates such as methyl lactate, ethyl lactate, butyl lactate and the like; alcohols such as methylol urea, methylol melamine, diacetone alcohol, 2-hydroxyethyl acrylate, 2-hydroxyethyl methacrylate and the like; oximes such as formamideoxime, acetamideoxime, acetoxime, methylethylketooxime, diacetylmonooxime, benzophenoneoxime, cyclohexaneoxime and the like; active methylenes such as dimethyl malonate, diethyl malonate, ethyl acetoacetate, methyl acetoacetate, acetylacetone and the like; mercaptans such as butylmercaptan, t-butylmercaptan, hexylmercaptan, t-dodecylmercaptan, 2-mercaptobenzothiazole, thiophenol, methylthiophenyl, ethylthiophenyl and the like; acid amides such as acetanilide, acetanisizide, acetotoluide, acrylamide, methacrylamide, acetic acid amide, stearic acid amide, benzamide and the like; imides such as succinic acid imide, phthalic acid imide, maleic acid imide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; pyrazoles such as 3,5-dimethylpyrazole and the like; ureas such as urea, thiourea, ethyleneurea, ethylenethiourea, diphenylurea and the like; carbamates such as phenyl N-phenylcarbamate and the like; imines such as ethyleneimine, propyleneimine and the like; sulfites such as sodium bisulfite, potassium bisulfite; and the like.

The water-dispersible blocked polyisocyanate curing agent ($B_3$) in the present invention is a blocked polyisocyanate prepared by blocking an isocyanate group of a polyisocyanate with a blocking agent and hydroxymonocarboxylic acids, followed by neutralizing the carboxyl group of the hydroxymonocarboxylic acid to impart water-dispersibility.

The polyisocyanate may include the polyisocyanate as exemplified in the blocked polyisocyanate curing agent ($B_1$), and preferably may include hexamethylene diisocyanate (HMDI), derivatives of hexamethylene diisocyanate (HMDI), isophorone diisocyanate (IPDI), and derivatives of isophorone diisocyanate.

In the preparation of the water-dispersible blocked polyisocyanate curing agent ($B_3$), the isocyanate group of the polyisocyanate is blocked with the blocking agent, and reacted with the hydroxymonocarboxylic acid, so that addition of at least one isocyanate group of the polyisocyanate to the hydroxyl group of the hydroxymonocarboxylic acid may take place.

The blocking agent may include the blocking agent as exemplified in the blocked polyisocyanate curing agent ($B_1$) The hydroxymonocarboxylic acids may include 2-hydroxyacetic acid, 2-hydroxypropanoic acid, 1,2-hydroxy-9-octadecanoic acid (ricinoleic acid), 3-hydroxy-2,2-dimethylpropanoic acid (hydroxypivalic acid), dimethylolpropionic acid (DMPA) and the like. Of these, 3-hydroxy-2,2-dimethylpropanoic acid (hydroxypivalic acid) is preferable. The solvent used in the reaction may include ones non-reactive with isocyanate group, and, for example, ketones such as acetone, methyl ethyl ketone and the like, esters such as ethylacetate and the like, and N-methylpyrrolidone (NMP).

The blocked polyisocyanate curing agent ($B_1$), ($B_2$) or ($B_3$) may be used in such an amount that a functional group ratio (NCO/OH), i.e. a ratio of isocyanate group (NCO) in the blocked polyisocyanate curing agent ($B_1$) or in a mixture of the curing agent ($B_1$) with the curing agent ($B_2$) and/or ($B_3$) to hydroxyl group (OH) in the polyester ($A_1$) or ($A_2$) may preferably be in the range of 0.8 to 1.3.

The melamine resin curing agent ($B_4$) may include a methylol amino resin obtained by reacting melamine with an aldehyde. The aldehyde may include formaldehyde, paraformaldehyde, acetaldehyde, benzaldehyde and the like. The above melamine resin curing agent ($B_4$) may also include ones obtained by etherifying a part or all of the methylol group in the methylol amino resin with a monoalcohol. The monoalcohol used in etherification may include methyl alcohol, ethyl alcohol, n-propyl alcohol, i-propyl alcohol, n-butyl alcohol, i-butyl alcohol, 2-ethyl butanol, 2-ethyl hexanol and the like.

The melamine may preferably include such a melamine that at least three methylol groups on an average per one triazine nucleus are methyl etherified, and a hydrophilic melamine which is such a melamine resin that a part of the methoxy group obtained as above is substituted with a monoalcohol having 2 or more carbon atoms, and which further has an imino group, an average degree of condensation of about 2 or less, and about 50% by weight of a melamine having one triazine nucleus. Examples of the trade names thereof may include Cymel 325 (trade name, marketed by Mitsui Cytec Ltd., imino group-containing melamine resin), and the like.

The color pigment (C) used in the present invention is a colorant to impart a color beauty to a coating film, and may include any pigments usually used in the coating composition, for example, an inorganic pigment such as titanium oxide, zinc oxide, carbon black, cadmium red, molybdenum red, chrome yellow, Prussian blue, cobalt blue and the like; an organic pigment such as azo pigment, phthalocyanine pigment, quinacridone pigment, isoindolin pigment, threne pigment, perylene pigment and the like; and metallic pigment such as scaly aluminum, mica, metallic oxide-coated mica, mica-shaped iron oxide and the like.

A mixing amount of the color pigment (C) may optionally be selected depending on uses, and may suitably be in the range of 1 to 200 parts by weight per 100 parts by weight of a total solid content of the hydroxyl group-containing resin (A) and the curing agent (B).

Examples of the extender pigment (D) used in the present invention may include clay, baryta, settling barium sulfate, barium carbonate, calcium carbonate, silica, white carbon, diatomaceous earth, magnesium carbonate, talc, aluminum flake, mica flake, and the like.

A mixing amount of the extender pigment (D) may optionally be selected depending on uses, and may suitably be in the range of 0.1 to 50 parts by weight per 100 parts by weight of a total solid content of the hydroxyl group-containing resin (A) and the curing agent (B) The water based intercoat coating composition of the present invention may further contain an urethane emulsion (E) for the purpose of further improving anti-chipping properties.

The urethane emulsion (E) is an emulsion obtained by use of a reaction product of an aliphatic and/or alicyclic diisocyanate, a polyether diol and/or polyester diol having a number average molecular weight of 500 to 5,000, a low molecular weight polyhydroxy compound and a dimethylol alkane acid, specifically is a self-emulsifiable urethane emulsion having a mean particle size of 0.001 to 3 $\mu$m and prepared by a method which comprises polymerizing the aliphatic and/or alicyclic diisocyanate, the polyether diol and/or polyester diol having the number average molecular weight of 500 to 5,000, the low molecular weight polyhydroxy compound and the dimethylol alkane acid in the presence of a hydrophilic organic solvent not having an active hydrogen reactable with isocyanate group in the molecule at a NCO to OH equivalent ratio of 1.1 to 1.9 by a one shot method or a multi-stage method to obtain an urethane prepolymer, followed by neutralizing the prepolymer with a tertiary amine and mixing with water to take place a water-lengthening reaction, or followed by mixing with water to take place a water-lengthening reaction, while neutralizing the prepolymer with a tertiary amine, emulsifying and dispersing into water, and by optionally distilling off the organic solvent. Examples of trade names for the urethane emulsion may include U Coat UX8100 (trade name marketed by Sanyo Chemical Industries Ltd.) and the like.

In the water based intercoat coating composition of the present invention, a mixing ratio of the hydroxyl group-containing resin (A) to the curing agent ($B_1$) is such that a (A)/($B_1$) weight ratio is in the range of 25/75 to 75/25.

A mixing ratio of the curing agent ($B_1$) to the curing agent ($B_2$) in the present invention is such that a ($B_1$)/($B_2$) weight ratio in the present invention is in the range of 10/0 to 1/9.

A mixing ratio of the curing agent ($B_1$) to the curing agent ($B_3$) in the present invention is such that a ($B_1$)/($B_3$) weight ratio is in the range of 10/0 to 1/9.

A mixing ratio of the curing agent ($B_1$) to the curing agent ($B_4$) is such that a ($B_1$)/($B_4$) weight ratio is in the range of 10/0 to 1/9.

A mixing amount of the curing agents ($B_1$), ($B_2$), ($B_3$) and ($B_4$) may not particularly be limited, and may arbitrarily be selected depending on performances to be used.

A mixing amount of the urethane emulsion (E) in the present invention is in the range of 10 to 100 parts by weight per 100 parts by weight of a total amount of the hydroxyl group-containing resin (A) and the curing agent (B).

The water based intercoat coating composition may be prepared by a method which comprises formulating the components (A), ($B_1$), ($B_2$), ($B_3$), ($B_4$), preferably (C), (D) and (E), followed by mixing and dispersing into water.

The water based intercoat coating composition of the present invention may be made water-dispersible by neutralizing the carboxyl group in the hydroxyl group-containing resin (A) and the curing agent (B) with a neutralizing agent.

The neutralizing agent may include, for example, hydroxides of alkali metal or alkaline earth metal such as sodium hydroxide, potassium hydroxide, lithium hydroxide, calcium hydroxide, barium hydroxide and the like; ammonia; a primary monoamine such as ethylamine, propylamine, butylamine, benzylamine, monoethanolamine, neopentanolamine, 2-aminopropanol, 3-aminopropanol and the like; a secondary monoamine such as diethylamine, diethanolamine, di-n- or di-iso-propanolamine, N-methylethanolamine, N-ethylethanolamine and the like; a tertiary monoamine such as dimethylethanolamine, trimethylamine, triethylamine, triisopropylamine, methyldiethanolamine, dimethylaminoethanol and the like; a polyamine such as diethylenetriamine, hydroxyethylaminoethylamine, ethylaminoethylamine, methylaminopropylamine and the like; and the like.

The water based intercoat coating composition of the present invention may optionally contain an extender pigment, dispersant, anti-settling agent, organic solvent, urethane-forming reaction-promoting catalyst such as an organotin compound, hydroxy group-melamine resin crosslinking reaction-promoting catalyst such as an acid catalyst, anti-foaming agent, thickening agent, anti-corrosive agent, ultraviolet light absorbent, surface controlling agent and the like.

A curing catalyst may be added for the purpose of promoting a crosslinking reaction of the coating film. The curing catalyst may include an organometallic compound such as tin octylate, dibutyltin(2-ethylhexanoate), dioctyltin-di(2-ethylhexanoate), dioctyltindiacetate, dibutyltindilaurate, dibutyltinoxide, monobutyltintrioctate, lead 2-ethylhexanoate, zinc octylate and the like.

A mixing amount of the curing catalyst may be arbitrarily selected, but is in the range of 0.005 to 5% by weight, particularly 0.01 to 3% by weight based on a total solid content of the hydroxyl group-containing resin (A), the curing agent (B) and the urethane emulsion (E), when used.

Coating may be carried out by the known coating methods, for example, spray coating, air spray coating, airless spray coating, electrostatic coating and the like, so as to form a coating film having a thickness in the range of 3 to 100 μm, particularly 5 to 60 μm as a cured coating film. The resulting coating film may be heated at 120 to 170° C., particularly 130 to 160° C. for 10 to 40 minutes so as to be crosslinked and cured.

The coating film formed by use of the water based intercoat coating composition shows excellent anti-chipping properties, and the water based intercoat coating composition may preferably be used as an intercoat coating composition for use in a multi-layer coating film formed onto an outer plate area of an automobile body or the like by coating a primer coating composition, an intercoat coating composition, curing or not curing, and by coating a topcoat coating composition.

At least one topcoat coating composition selected from a solid color coating composition, metallic coating composition, light-coherent coating composition, clear coating composition and the like may be coated so as to form a monolayer or multi-layer topcoating film.

A multi-layer coating film-forming method by use of the water based intercoat coating composition of the present invention is explained more in detail hereinafter.

The multi-layer coating film-forming method comprises coating a primer coating composition such as a cationic electrodeposition coating composition, followed by coating a water based intercoat coating composition, and coating a colored base coating composition or a clear coating composition to form monolayer or multi-layer colored base coating film or monolayer or multi-layer clear coating film, and may specifically include the following methods (a) to (c)

The method (a) may include a one coat•one bake (1C1B) method which comprises coating a primer coating composition such as a cationic electrodeposition coating composition and the like onto a metal or plastic substrate as in the automobile, followed by coating the water based intercoat coating composition of the present invention, curing, and coating a solid color topcoating composition by a coating method such as airless spray coating, air spray coating, rotary spray coating and the like so as to be a coating film thickness in the range of about 10 to 50 μm, and heat curing at about 100 to 180° C. for about 10 to 90 minutes.

The method (b) may include a two coats•one bake (2C1B) coating method and a two coats•two bakes (2C2B) coating method which comprise coating a primer coating composition such as a cationic electrodeposition coating composition and the like onto a metal or plastic substrate, followed by coating the water based intercoat coating composition of the present invention, curing, coating a colored coating composition by a coating method such as an airless spray coating, air spray coating, rotary spray coating and the like so as to be a coating film thickness in the range of about 10 to 50 μm, heat curing at about 100 to 180° C. for about 10 to 40 minutes, or leaving to stand at room temperature for several minutes or preheating without curing, coating a clear coating composition so as to be a cured coating film thickness in the range of about 10 to 70 μm, and heat curing at about 60 to 160° C. for about 10 to 90 minutes.

The method (c) uses the same colored coating composition as that used in the method (a) and a transparent coating film-forming coating composition as a first clear coating composition, i.e. such a coating composition that almost all of the pigment is removed from the colored coating composition, and includes a three coats•one bake (3C1B) method, three coats•two bakes (3C2B) method and three coats•three bakes (3C3B) method, which comprise coating a colored coating composition, followed by coating a first clear coating composition so as to be a cured coating film thickness in the range of about 10 to 50 μm, heat curing at about 60 to 160° C. for about 10 to 90 minutes, or leaving to stand at room temperature for several minutes or preheating without curing, and coating a second clear coating composition so as to be a cured coating film thickness in the range of about 10 to 70 μm, and heat curing at about 60 to 180° C. for about 10 to 90 minutes.

The present invention provides the following particular effects.

The present invention can provide a light-colored water based intercoat coating composition capable of forming a coating film showing excellent properties in yellowing resistance to heat curing at 130° C. or higher, anti-chipping properties and beautiful appearance, and applicable to a white pearl coating color, and can provide a multi-layer coating film formed by use of the intercoat coating composition.

More specifically, the use of a light-colored water based intercoat coating composition which contains a hydroxyl group-containing resin (A), a curing agent (B) comprising a blocked polyisocyanate curing agent ($B_1$) blocked with a pyrazole blocking agent ($B_1$) and a color pigment (C) and forms a coating film having a lightness index or a L value of 80 or more, shows excellent properties in yellowing resistance even to heat curing at 130° C. or higher and curing properties, resulting in making it possible to form a coating film showing a good balance between beautiful appearance and anti-chipping properties, and particularly regarding to yellowing properties, resulting in that a b value difference (Δb) between a coating film under a standard heat curing condition of 150° C. for 20 minutes and a coating film under a heat curing condition of 160° C. for 20 minutes is within 0.5.

Yellowing properties defined by (Δb) of a multi-layer coating film formed by coating the light-colored water based intercoat coating composition, heat curing under the standard heat curing condition of 150° C. for 20 minutes to form a cured coating film, coating a topcoat coating composition onto the cured coating film, and by curing is such that a b value difference (Δb) between a b value of the above multi-layer coating film and that of a multi-layer coating film formed by coating the light-colored water based intercoat coating composition, heat curing under the condition of 160° C. for 20 minutes to form a cured coating film, coating a topcoat coating composition onto the above cured coating film, and by curing is within 0.9, resulting in making it possible to find a light-colored water based intercoat coating composition applicable to a color base showing white pearl coating color.

EXAMPLE

The present invention is explained more in detail by the following Examples, in which "part" and "%" represent "part by weight" and "% by weight" respectively. The present invention is not limited to the Examples.

Preparation Example of Polyester Resin No. 1

A four-necked flask equipped with a heater, stirrer, thermometer, reflux condenser and a water separator was charged with 61.9 parts of 1,3-cyclohexane dicarboxylic acid, 70.1 parts of adipic acid, 62.8 parts of trimethylolpropane, 24.2 parts of neopentyl glycol and 44.6 parts of 1,4-cyclohexane dimethanol, followed by heating the content up from 160° C. to 230° C. over 3 hours, keeping at 230° C. for one hour, distilling off a resulting condensation water by use of a fractionating column, adding 15.0 parts of anhydrous trimellitic acid to the resulting product, desolvating, neutralizing with dimethylethanolamine, and mixing with water to obtain polyester resin No. 1 having a solid content of 40%, hydroxyl value of 150 mgKOH/g, acid value of 35 mgKOH/g and a number average molecular weight of 2,000.

Preparation Example of Polyester Resin No. 2

A four-necked flask equipped with a heater, stirrer, thermometer, reflux condenser and a water separator was charged with 61.9 parts of 1,3-cyclohexane dicarboxylic acid, 70.1 parts of adipic acid, 62.8 parts of trimethylolpropane, 24.2 parts of neopentyl glycol and 44.6 parts of 1,4-cyclohexane dimethanol, followed by heating the content up from 160° C. to 230° C. over 3 hours, keeping at 230° C. for one hour, distilling off a resulting condensation water by use of a fractionating column, adding 10.6 parts of anhydrous trimellitic acid to the resulting product, desolvating, neutralizing with dimethylethanolamine, and mixing with water to obtain polyester resin No. 2 having a solid content of 40%, hydroxyl value of 168 mgKOH/g, acid value of 25 mgKOH/g and a number average molecular weight of 2,000.

Preparation Example of Polyester Resin No. 3

A four-necked flask equipped with a heater, stirrer, thermometer, reflux condenser and a water separator was charged with 43.8 parts of adipic acid, 77.0 parts of isophthalic acid, 54.6 parts of trimethylolpropane, 64.0 parts of butylethylpropanediol and 21.0 parts of neopentyl glycol, followed by reacting, adding 15.3 parts of anhydrous trimellitic acid to the reaction product, desolvating, neutralizing with dimethylethanolamine, and mixing with water to obtain polyester resin No. 3 having a solid content of 40%, hydroxyl value of 140 mgKOH/g, acid value of 35 mgKOH/g and a number average molecular weight of 2,000.

Preparation Example of Polyester Resin No. 4

A four-necked flask equipped with a heater, stirrer, thermometer, reflux condenser, nitrogen gas-introducing device and dropping device was charged with 182 parts of 1,6-hexanediol, 144 parts of trimethylol propane, 104 parts of Cardura E10 (trade name, marketed by Japan Epoxy Resins Co., Ltd., versatic acid glycidyl ester), 132 parts of adipic acid, and 246 parts of phthalic acid, followed by condensating at 230° C., cooling at the time when an acid value became 2 or less, adding 46 parts of anhydrous trimellitic acid, reacting at 170° C. for 30 minutes, adding dipropylene glycol monomethyl ether, cooling down to 80° C., neutralizing with dimethylethanolamine while stirring, and adding deionized water and dispersing to obtain an aqueous polyester resin solution having a solid content of 45%, an acid value of 35 mgKOH/g, a hydroxy value of 120 mgKOH/g and pH of 7.2.

Preparation Example of Acrylic Resin

A reactor equipped with a thermometer, temperature controller, stirrer, reflux condenser and dropping device was charged with 300 parts of deionized water and 4.8 parts of 25% Reasope SE-1025 (surface active agent, trade name, marketed by Asahi Denka Co., Ltd.), followed by mixing with agitation under nitrogen stream, heating up to 82° C., adding 3% by part or 28.3 parts of the following monomer emulsion ① and 60 parts of 1% sodium persulfate aqueous solution, keeping at 82° C. for 20 minutes, dropping a mixture prepared by mixing 120 parts of the 1% sodium persulfate aqueous solution and the balance of the monomer emulsion ① into the reactor by use of a metering pump over 4 hours, aging for 2 hours, adding 282 parts of 1% dimethylethanolamine aqueous solution, keeping at 82° C. for 30 minutes, cooling down to 30° C., filtering with a 200 mesh nylon cloth and separating to obtain an aqueous acrylic resin solution having a solid content of 40.0%, a pH of 6.5 and a mean particle size of 0.15 $\mu$m.

Composition of Monomer Emulsion ①:

| | |
|---|---|
| deionized water | 300 parts |
| 25% SE-1025 | 43.2 parts |
| styrene | 180 parts |
| n-butyl acrylate | 336 parts |
| 2-hydroxyethyl acrylate | 60 parts |
| acrylic resin | 24 parts |

Preparation Example of Curing Agent No. 1

The following composition containing components (1) to (6) was used to obtain the curing agent No. 1 as follows.

| Composition: | | % by weight |
|---|---|---|
| (1) | 1,6-hexamethylene diisocyanate trimer | 30 |
| (2) | polyoxyalkyleneamine (Jeffermine M-1000, trade name, marketed by Huntsman Chemical Co., Ltd.) | 3 |
| (3) | 3,5-dimethylpyrazole (blocking agent) | 16 |
| (4) | butyl glycol ether (solvent) | 7 |
| (5) | sodium sulfosuccinate | 4 |
| (6) | water | 40 |

A reactor was charged with component (1), followed by slowly adding component (2), heating up to 60 to 70° C. so that an isocyanate content may reach 20 to 21 mol %, keeping at 60 to 70° C. until the isocyanate content reaches zero, while slowly adding component (3), adding components (4) and (5), mixing for 5 minutes, adding component (6) water, and forming a dispersion by use of a high speed mixer.

Jeffermine M-1000 is an active hydrogen-containing compound which reacts with HMDI (1,6-hexamethylene diisocyanate) trimer to form a polyisocyanate prepolymer. The sodium sulfosuccinate is an ionic surface active agent which assists controlling a particle size of the dispersion.

Curing Agent No. 2

Cymel 325 (trade name, marketed by Mitsui Cytec, Ltd., imino group-containing melamine resin) was used as curing agent No. 2.

Preparation Example of Curing Agent No. 3

Preparation Example of curing agent No. 1 was duplicated except that 14.5 parts of methyl ethyl ketoxime was used in place of 3,5-dimethylpyrazole in curing agent No. 1 to obtain curing agent No. 3.

Preparation Example of Curing Agent No. 4

Preparation Example of curing agent No. 1 was duplicated except that 22 parts of dimethyl malonate was used in place of 3,5-dimethylpyrazole in curing agent No. 1 to obtain curing agent No. 4.

Example 1

A mixture of 112.5 parts (solid content 45 parts) of polyester resin No. 1, 110 parts (solid content 55 parts) of curing agent No. 1 and 80 parts (solid content 80 parts) of JR-806 (Note 2) was dispersed, followed by adding deionized water and controlling a viscosity at 50 seconds, 20° C., Ford-Cup No. 4 to obtain a water based intercoat coating composition No. 1. Results are shown in Table 1.

Examples 2–5 and Comparative Examples 1–5

Example 1 was duplicated according to the formulations in Table 1 to obtain water based intercoat coating compositions No. 2 to No. 10 of Examples 2–5 and Comparative Examples 1–5 respectively. In Table 1, a mixing amount is represented by solid content part by weight.

ing Co., Ltd., zinc phosphate treatment) to form a coating film having a dry film thickness of 20 μm, followed by coating water based intercoat coating composition No. 1 to No. 10 as prepared in Examples and Comparative Examples to be a film thickness of 30 μm, heat curing at 150° C. for 30 minutes, coating Magicron TB-516 Mica Base (Trade name, marketed by Kansai Paint Co., Ltd.) to a film thickness of 15 μm, leaving to stand at room temperature for 3 minutes to form an uncured coating film, coating a clear coating composition Magicron KINO 1200 Clear (Trade name, marketed by Kansai Paint Co., Ltd.) to a film thickness of 35 μm, and heat curing both coating films at 140° C. for 30 minutes simultaneously to obtain multi-layer coating films respectively.

Test Results

Performance test results of the above multi-layer coating films are shown in Table 1, in which mixing amounts of respective components are represented by weight of the solid content respectively.

(Note 3) L value: L value measured by use of SM color computer (marketed by Suga Test Instruments Co., Ltd.)

(Note 4) b value: b value measured by use of SM color computer (marketed by Suga Test Instruments Co., Ltd.), wherein the b value represents an yellow color in L*a*b* color system in accordance with JIS Z 8729.

(Note 5) Yellowing properties (Δb): Yellowing properties was evaluated by a b value difference (Δb) between a b value under a predetermined heat curing condition and that under a standard heat curing condition as measured by use of SM color computer (marketed by Suga Test Instruments Co., Ltd.) as follows.

TABLE 1

| | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Water based intercoat coating composition | | 1 | 2 | 3 | 4 | 5 | 6 | 7 | 8 | 1 | 2 | 3 | 4 | 5 | 6 |
| Polyester resin No. 1 | | 45 | | 27 | 20 | | | | | 45 | 41 | | | | |
| Polyester resin No. 2 | | | 45 | | | | | | | | | | | | |
| Polyester resin No. 3 | | | | | | 45 | | | | | | 20 | | | |
| Polyester resin No. 4 | | | | | | | 45 | | | | | | 41 | | |
| Bayhydrol PT241 (Note A) | | | | | | | | 30 | | | | | | 45 | |
| Acrylic resin | | | | | 25 | | | | 45 | | | 25 | | | 45 |
| Curing agent No. 1 | | 55 | 55 | 33 | 55 | 55 | 55 | 70 | 55 | | | | | | |
| Curing agent No. 2 | | | | | | | | | | | | | | 55 | 55 |
| Curing agent No. 3 | | | | | | | | | | 55 | | 55 | | | |
| Curing agent No. 4 | | | | | | | | | | | 59 | | 59 | | |
| UX 8100 (Note 1) | | | | 40 | | | | | | | | | | | |
| JR 806 (Note 2) | | 80 | 80 | 80 | 80 | 80 | 80 | 80 | 80 | 80 | 80 | 80 | 80 | 80 | 80 |
| Intercoat coating film | L value | 86 | 86 | 86 | 86 | 86 | 86 | 86 | 86 | 86 | 84 | 86 | 85 | 84 | 84 |
| | b value | 1.2 | 1.2 | 1.4 | 1.4 | 1.3 | 1.5 | 1.4 | 1.4 | 1.5 | 1.4 | 1.5 | 1.5 | 1.6 | 1.5 |
| | yellowing properties A | 0.1 | 0.1 | 0.3 | 0.3 | 0.2 | 0.3 | 0.4 | 0.3 | 0.6 | 0.7 | 0.8 | 0.7 | 0.6 | 0.6 |
| | yellowing properties B | 0.1 | 0.1 | 0.3 | 0.3 | 0.3 | 0.3 | 0.5 | 0.3 | 0.7 | 1.1 | 1.1 | 1.2 | 0.6 | 0.6 |
| Multi-layer coating film | L value | 81 | 81 | 81 | 81 | 81 | 81 | 81 | 81 | 81 | 78 | 81 | 80 | 80 | 80 |
| | b value | 3.2 | 3.2 | 3.5 | 3.4 | 3.3 | 3.2 | 3.1 | 3.4 | 3.6 | 3.6 | 3.2 | 3.3 | 3.3 | 3.4 |
| | yellowing properties C | 0.6 | 0.6 | 0.9 | 0.7 | 0.7 | 0.6 | 0.9 | 0.8 | 1.5 | 1.2 | 1.6 | 1.3 | 1 | 1 |
| | yellowing properties D | 0.8 | 0.8 | 0.9 | 0.9 | 0.9 | 0.8 | 0.9 | 0.8 | 1.8 | 1.4 | 2 | 1.6 | 1.1 | 1 |
| | water resistance | ○ | ○ | ○ | ○ | ○ | ○ | ○ | ○ | ○ | ○ | ○ | ○ | Δ | Δ |
| | anti-chipping properties | ○ | ○ | ◎ | ○ | ○ | ○ | ○ | ○ | ○ | ○ | Δ | Δ | Δ | X |

(Note 1) Urethane Emulsion (trade name, marketed by Sanyo Chemical Industries Ltd.).
(Note 2) JR 806: trade name, marketed by Tayka Corporation, titanium white.
(Note A) Byhydrol PT241, trade name, marketed by Sumitomo Bayel Urethane Co., Ltd., urethane-modified polyester resin.

Preparation of Test Panel for Coating Film Performance Test

Elecron GT-10 (trade name, marketed by Kansai Paint Co., Ltd., cationic electrodeposition coating composition) was coated onto a cold rolled steel sheet treated with Palbond #3020 (trade name, marketed by Nippon Parkerizgood: $\Delta b \leq 0.9$; slightly poor: $0.9 < \Delta b \leq 1.0$ seriously poor: $1.0 < \Delta b$ (Note 6) Yellowing properties A: Evaluation was made by a b value difference (Δb) between a b value under a heat curing condition of 160° C. and 30 minutes and a b value under a standard heat curing condition of 150° C. for 30 minutes for an intercoat coating film.

(Note 7) Yellowing properties B: Evaluation was made by a b value difference (Δb) between a b value under an overbaking condition of 160° C. and 60 minutes and the b value under the standard heat curing condition of 150° C. and 30 minutes for the intercoat coating film.

(Note 8) Yellowing properties C: Evaluation was made by a b value difference (Δb) between a b value under a heat curing condition of 160° C. and 30 minutes and a b value under a standard heat curing condition of 140° C. and 30 minutes for a topcoat coating film.

(Note 9) Yellowing properties D: Evaluation was made by a b value difference (Δb) between a b value under a heat curing condition of 160° C. and 60 minutes and the b value under the standard heat curing condition of 140° C. and 30 minutes for the topcoat coating film.

(Note 10) Water resistance: A test panel was dipped into a hot water at 40° C. for 10 days, followed by visually examining the conditions of the surface of the coating film as follows.

○: No blisters developed,

Δ: Slight blisters developed,

X: Many blisters developed.

(Note 11) Anti-chipping properties: A test panel was mounted on a test panel holder of a JA-400 type rebounding gravels test instrument marketed by Saga test instruments Co., Ltd. (chipping test apparatus), followed by spraying 50 g of granite gravels having a particle size of No. 7 onto the surface of a coating film under an air pressure of 0.392 MPa (4 kgf/cm²) at −20° C., and visually evaluating degree of development of mars on the coating film as follows.

◎: Size of the mar is considerably small and the intercoat coating film is slightly exposed, ○: Size of the mar is small and the intercoat coating film is exposed, Δ: size of the mar is small, but steel sheet substrate is exposed, X: size of the mar is considerably large, and the steel sheet substrate is largely exposed.

What is claimed is:

1. A light-colored water based intercoat coating composition containing a hydroxyl group-containing resin (A), a curing agent (B) and a color pigment (C), a resulting coating film having a lightness index or a L value of 80 or more, the hydroxyl group-containing resin (A) comprising hydroxyl group-containing polyester resin ($A_2$) containing as essential components an alicyclic polybasic acid ($a_1$) and/or an alicyclic polyhydric alcohol ($a_2$), other polybasic acid ($a_3$) and other polyhydric alcohol ($a_4$), a content of the alicyclic polybasic acid ($a_1$) and/or the alicyclic polyhydric alcohol ($a_3$) in the polyester resin ($A_2$) being in the range of 20 to 70% by weight based on a total solid content of monomers constituting the polyester resin ($A_2$), the curing agent (B) being a blocked polyisocyanate curing agent ($B_1$) blocked with a pyrazole blocking agent, or a mixture of the blocked polyisocyanate curing agent ($B_1$) with at least one curing agent selected from the group consisting of a blocked polyisocyanate curing aaent ($B_2$) blocked with a blocking agent other than the pyrazole blocking agent, a water-dispersible blocked polyisocyanate curing agent ($B_3$) and a melamine resin curing agent ($B_4$).

2. A light-colored water based intercoat coating composition as claimed in claim 1, wherein the blocked polyisocyanate curing agent ($B_1$) is a blocked polyisocyanate curing agent blocked with 3,5-dimethylpyrazole blocking agent.

3. A light-colored water based intercoat coating composition as claimed in claim 1, wherein a polyisocyanate constituting the blocked polyisocyanate curing agent ($B_1$) is an aliphatic polyisocyanate or an alicyclic polyisocyanate.

4. A light-colored water based intercoat coating composition as claimed in claim 1 wherein a polyisocyanate constituting the blocked polyisocyanate curing agent ($B_2$) is an aliphatic polyisocyanate or alicyclic polyisocyanate.

5. A light-colored water based intercoat coating composition as claimed in claim 1, wherein the water based intercoat coating composition further contains an extender pigment (D).

6. A light-colored water based intercoat coating composition as claimed in claim 1, wherein the water based intercoat coating composition further contains an urethane emulsion (E).

7. A light-colored water based intercoat coating composition as claimed in claim 6, wherein a content of the urethane emulsion (E) is in the range of 10 to 100 parts by weight per 100 parts by weight of a total solid content of the hydroxyl group-containing resin (A) and the curing agent (B).

8. A multi-layered coating film formed by successively coating a cationic electrodeposition coating composition, coating a water based intercoat coating composition as claimed in claim 1, optionally curing, and coating a topcoat coating composition by at least one layer.

9. A light-colored water based intercoat coating composition as claimed in claim 1, the hydroxyl group-containing resin (A) further comprises at least one hydroxyl group-containing resin selected from the group consisting of a hydroxyl group-containing acrylic resin, a hydroxyl group-containing polyester resin, a hydroxyl group-containing polyether resin, a hydroxyl group-containing polycarbonate resin and a hydroxyl group-containing urethane resin.

10. A light-colored water based intercoat coating composition as claimed in claim 2, wherein a polyisocyanate constituting the blocked polyisocyanate curing agent ($B_1$) is an aliphatic polyisocyanate or an alicyclic polysiscoyanate.

11. A light-colored water based intercoat coating composition as claimed in claim 2, wherein a polyisocyanate constituting the blocked polyisocyanate curing agent ($B_2$) is an aliphatic polyisocyanate or alicyclic polyisocyanate.

12. A light-colored water based intercoat coating composition as claimed in claim 4, wherein the water based intercoat coating composition further contains an extender pigment (D).

13. A light-colored water based intercoat coating composition as claimed in claim 5, wherein the water based intercoat coating composition further contains an urethane emulsion (E).

14. A multi-layered coating film formed by successively coating a cationic electrodeposition coating composition, coating a water based intercoat coating composition as claimed in claim 7, optionally curing, and coating a topcoat coating composition by at least one layer.

* * * * *